United States Patent
Sekine et al.

(10) Patent No.: US 6,973,013 B2
(45) Date of Patent: Dec. 6, 2005

(54) TRACK JUMP APPARATUS CAPABLE OF VARYING MOVING PULSE AND BRAKING PULSE

(75) Inventors: Kazuhiro Sekine, Tokyo (JP); Hirotomo Yunoki, Chiba (JP)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 10/230,089

(22) Filed: Aug. 29, 2002

(65) Prior Publication Data

US 2003/0072222 A1   Apr. 17, 2003

(30) Foreign Application Priority Data

Aug. 31, 2001   (JP) .............................. 2001-263364

(51) Int. Cl.[7] ............................................ G11B 21/08
(52) U.S. Cl. .............................. 369/30.16; 369/30.17; 369/44.28
(58) Field of Search .......................... 369/30.16, 30.17, 369/30.1, 30.11, 30.12, 30.13, 30.14, 30.15, 369/44.28, 44.27, 44.29, 44.34, 44.35

(56) References Cited

U.S. PATENT DOCUMENTS

| | | | |
|---|---|---|---|
| 4,803,675 A * | 2/1989 | Komatsu ................. | 369/30.16 |
| 5,065,383 A * | 11/1991 | Tateishi et al. .......... | 369/30.13 |
| 5,134,599 A * | 7/1992 | Baas ....................... | 369/44.27 |
| 5,532,988 A * | 7/1996 | Yokogama ............... | 369/44.28 |
| 5,577,009 A * | 11/1996 | Takamine ................ | 369/30.16 |
| 5,604,720 A * | 2/1997 | Kimura et al. ........... | 369/30.17 |
| 5,623,460 A * | 4/1997 | Nagasawa et al. ......... | 369/30.1 |
| 5,699,332 A * | 12/1997 | Nakano .................... | 369/30.16 |
| 6,222,798 B1 * | 4/2001 | Kimura et al. ............. | 369/30.1 |
| 6,628,576 B1 * | 9/2003 | Watanabe et al. ......... | 369/30.17 |
| 6,762,981 B2 * | 7/2004 | Ono ........................ | 369/44.28 |
| 6,791,915 B1 * | 9/2004 | Lee et al. ................. | 369/44.32 |

* cited by examiner

Primary Examiner—Tan Dinh
(74) Attorney, Agent, or Firm—Oblon, Spivak, McClelland, Maier & Neustadt, P.C.

(57) ABSTRACT

A disk drive apparatus is disclosed for stabilizing a track jumping operation of an objective lens. The disk drive apparatus includes a detection section for detecting the direction that object lens is being moved by a tracking operation, and a discrimination section for discriminating the direction of the track jumping operation. A track jump movement then performed based on the detection of movement and discrimination of the track jump operation. Therefore, the track jump is stabilized without being influenced by the movement of the objective lens by the tracking operation.

8 Claims, 6 Drawing Sheets

TRACK JUMPING SIGNAL
BASED ON PARAMETER A

TRACK JUMPING SIGNAL
BASED ON PARAMETER B

TRACK JUMPING SIGNAL
BASED ON PARAMETER C

TRACK JUMPING SIGNAL
BASED ON PARAMETER D

TRACK JUMP APPARATUS CAPABLE OF VARYING MOVING PULSE AND BRAKING PULSE

BACKGROUND OF THE INVENTION

The present invention relates to a disk drive apparatus and a track jumping control method for a disk drive apparatus.

In a conventional disk drive apparatus, in order to cause an objective lens to perform a track jumping operation, a track jump signal composed of a moving pulse signal and a braking pulse signal is produced and used for the track jumping operation.

The moving pulse signal acts to apply force upon the objective lens to move it in a track jumping direction. On the other hand, the braking pulse signal acts to apply force upon the objective lens to move it in the direction opposite to the track jumping direction, that is, to brake the objective lens. In other words, the moving pulse signal accelerates the objective lens in the track jumping direction whereas the braking pulse signal decelerates the objective lens.

In conventional disk drive apparatus, usually the moving pulse signal and the braking pulse signal have an equal pulse width and an equal amplitude to perform a track jumping operation.

With such track jumping pulse signals, if the objective lens initially is in a stationary state, then since the objective lens is accelerated to a distance equal to one half the distance to a track of the target of the track jumping and is then decelerated in the remaining distance, the objective lens can be stopped just when it arrives at the target track.

However, usually in a disk drive apparatus, it is considered that the objective lens seldom starts its track jumping operation from its stationary state because, since periodical displacement of tracks is caused by some eccentricity of a disk, the objective lens is normally moved so that it may follow up a track through a tracking servo operation by control based on a tracking error signal and also external vibrations may possibly have an influence on the objective lens.

If, while the objective lens is moving through a tracking servo operation against eccentricity or disturbance in this manner, the moving direction of the objective lens and the direction of track jumping become the same direction, then the distance of the track jumping of the objective lens may become excessive. On the other hand, if the two directions become opposite to each other, then the distance of the track jumping of the objective lens may become insufficient. Thus, the conventional disk drive apparatus is disadvantageous in that the track jumping operation is not stabilized.

SUMMARY OF THE INVENTION

It is an object of the present invention to provide a disk drive apparatus and a track jumping control method by which a track jumping operation of an objective lens is stabilized.

According to an aspect of the present invention, there is provided a disk drive apparatus, including:

an objective lens;

means for moving the objective lens to follow up a track of a rotating disk;

signal production means for producing a track jump signal including a moving pulse signal and a braking pulse signal to drive the objective lens in a radial direction of the disk to perform a track jumping operation of the objective lens;

detection means for detecting a moving direction of the objective lens following up the track on the disk at a point of time immediately before the track jumping operation;

discrimination means for discriminating whether the feeding direction of the objective lens for the track jumping operation is a radially inward direction or a radially outward direction; and control means for controlling the signal production means to vary the level of the moving pulse signal and the level of the braking pulse signal of the track jump signal based on a result of the discrimination of the discrimination means and the moving direction detected by the detection means.

According to another aspect of the present invention, there is provided a track jump controlling method wherein a track jump signal including a moving pulse signal and a braking pulse signal is produced and an objective lens is driven in a radial direction of a rotating disk based on the produced track jump signal to perform a track jumping operation of the objective lens, including the steps of:

detecting a moving direction of the objective lens, which is moving following up a track on the disk, at a point of time immediately before the track jumping operation;

discriminating whether the feeding direction of the objective lens for the track jumping operation is a radially inward direction or a radially outward direction; and varying the level of the moving pulse signal and the level of the braking pulse signal of the track jump signal based on a result of the discrimination and a result of the detection.

With the disk reproduction apparatus and the track jump controlling method, by varying the levels of the moving pulse signal and the braking pulse signal of the track jumping signal based on results of the detection and the discrimination, the track jumping signal can be produced such that it conforms with conditions by a combination of the moving direction by a tracking operation of the objective lens immediately before a track jumping operation of the objective lens and the track jumping direction of the objective lens.

Further, where the levels of the moving pulse signal and the braking pulse signal are varied in this manner, when the track jumping direction of the objective lens and the moving direction, for example, by a tracking operation of the objective lens at the point of time immediately before the track jumping operation coincide with each other, if the level of the moving pulse signal is set to a comparatively low level and the level of the braking pulse signal is set to a comparatively high level, then the operation of the objective lens upon track jumping can be controlled so that the acceleration is comparatively low and the deceleration is comparatively high.

On the contrary, when the track jumping direction and the moving direction of the objective lens are opposite to each other, if the level of the moving pulse signal is set to a comparatively high level and the level of the braking pulse signal is set to a comparatively low level, then the operation of the objective lens upon track jumping can be controlled so that the acceleration is comparatively high and the deceleration is comparatively low.

Consequently, such a situation that the object lens moves excessively upon track jumping when the moving direction of the object lens which moves by a tracking operation and the track jumping direction coincide with each other and such another situation that the object lens moves insufficiently upon track jumping when the moving direction of the object lens and the track jumping direction are opposite to each other can be eliminated. As a result, a stabilized track jumping operation can be achieved.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
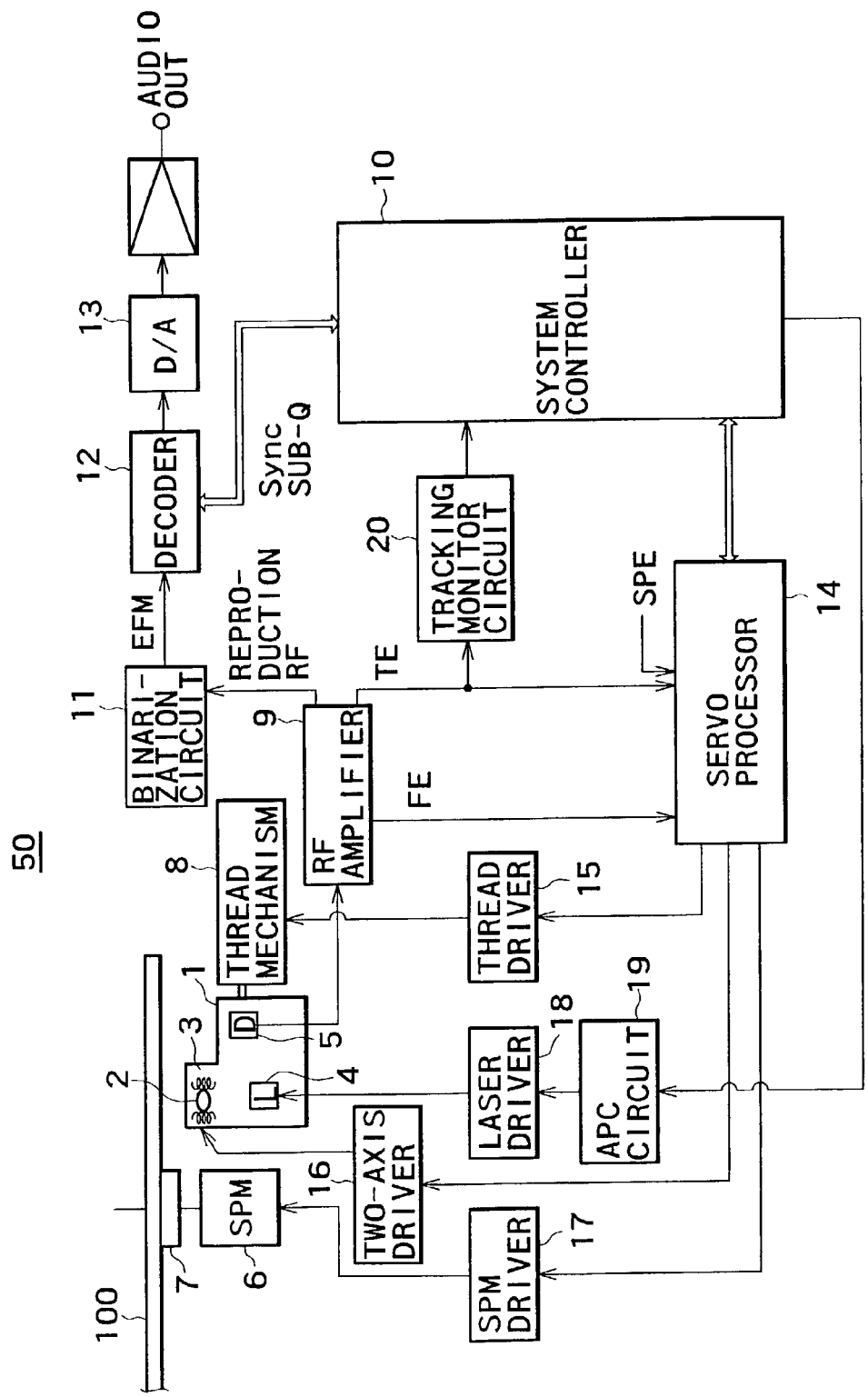
FIG. 1 is a block diagram showing an internal configuration of a disk reproduction apparatus to which the present invention is applied.

Referring first to FIG. 1, there is shown an internal configuration of a disk reproduction apparatus 50 to which the present invention is applied. A disk 100 is placed on a turntable 7 and is driven to rotate at a constant linear velocity (CLV) or a constant angular velocity (CAV) by a spindle motor 6 upon reproduction operation. During rotation of the disk 100, a pickup 1 reads out data recorded in the form of embossed pits, coloring matter pits, phase change pits or the like on the disk 100. It is to be noted that, in the following description of the present embodiment, it is assumed that the disk reproduction apparatus 50 is a CD (Compact Disk) player of the CLV type.

A laser diode 4 serving as a laser light source, a photo-detector 5 for detecting reflection light, an objective lens 2 which is an output end of the laser light, and an optical system for irradiating a laser beam from the laser diode 4 on a recording face of the disk 100 through the objective lens 2 and guiding the reflected light from the disk 100 to the photo-detector 5 are disposed in the pickup 1.

The objective lens 2 is mounted for movement in a tracking direction and a focusing direction by a two-axis mechanism 3.

Further, the entire pickup 1 is mounted for movement in a radial direction of the disk 100 by a thread mechanism 8.

Information of the reflected light from the disk 100 is detected and converted into an electric signal corresponding to a reception light amount by the photo-detector 5 and is supplied to an RF amplifier (RF) 9.

The RF amplifier 9 includes a plurality of current-voltage conversion circuits, matrix calculation and amplification circuits and so forth corresponding to a plurality of light reception elements of the photo-detector 5, and uses a matrix calculation process to produce necessary signals. The RF amplifier 9 produces, for example, an RF signal which is reproduction data, a focusing error signal FE for servo control, a tracking error signal TE and so forth.

The reproduction RF signal outputted from the RF amplifier 9 is supplied to a binarization circuit 11. The focusing error signal FE is supplied to a servo processor 14. The tracking error signal TE is supplied to the servo processor 14 and a tracking monitor circuit 20.

The reproduction RF signal obtained by the RF amplifier 9 is binarized by the binarization circuit 11 so that it is modulated into an EFM signal (8-14 modulation signal), and is supplied to a decoder 12. The decoder 12 performs an EFM demodulation process, an error correction process and so forth for the EFM signal and performs reproduction of the information read out from the disk 100. Then, the reproduced data is converted into an analog audio signal by a D/A converter (D/A) 13, and the analog audio signal is outputted from an audio output terminal as seen in FIG. 1.

Further, the decoder 12 extracts a frame synchronizing signal sync, sub code Q data and so forth and supplies them to a system controller 10.

The tracking monitor circuit 20 receives the tracking error signal TE from the RF amplifier 9 as an input thereto, and produces a tracking monitor signal based on the tracking error signal TE and detects the moving direction and the position of the objective lens 2 which it moves by a tracking operation. Further, the tracking monitor circuit 20 produces, based on a result of the detection just described, several kinds of signals which represent the moving direction and the position of the objective lens 2 and transmits the produced signals to the system controller 10. It is to be noted that a configuration and operation of the tracking monitor circuit 20 are hereinafter described.

The system controller 10 is formed from a microcomputer, and performs processing operation based on several kinds of operation signals from an operation section not shown and several kinds of data from the decoder 12 and controls the entire disk reproduction apparatus 50.

It is to be noted that, while, in the present embodiment, the system controller 10 receives several kinds of signals from the tracking monitor circuit 20 and performs track jumping control based on the signals, this operation is hereinafter described.

The servo processor 14 produces several kinds of servo drive signals for focusing, tracking, threading and the spindle based on the focusing error signal FE and the tracking error signal TE from the RF amplifier 9, and a spindle error signal SPE from the decoder 12 or the system controller 10 to perform servo operations.

In particular, the servo processor 14 produces the focusing drive signal and the tracking drive signal in response to the focusing error signal FE and the tracking error signal TE and supplies the produced drive signals to a two-axis driver 16. The two-axis driver 16 drives a focusing coil and a tracking coil of the two-axis mechanism 3 in the pickup 1. Consequently, a tracking servo loop and a focusing servo loop by the pickup 1, RF amplifier 9, servo processor 14, two-axis driver 16 and two-axis mechanism 3 are formed.

Further, the servo processor 14 produces the spindle drive signal based on the spindle error signal SPE, and supplies it to a spindle motor driver (SPM driver) 17. Consequently, the spindle motor driver 17 performs driving of the spindle motor 6 in response to the spindle drive signal.

Further, if a track jumping pulse parameter is transmitted from the system controller 10 to the servo processor 14, then the servo processor 14 produces a track jumping signal including a moving pulse signal and a braking pulse signal based on the parameter and turns its tracking servo operation into an off state. Then, the servo processor 14 supplies the track jumping signal to the two-axis driver 16 so that the objective lens 2 executes a track jumping operation based on the track jumping signal.

The laser diode 4 in the pickup 1 is driven by a laser driver 18 to emit a laser beam.

The system controller 10 sets a value of laser power to an automatic power control circuit (APC) 19 when reproduction of the disk 100 is to be executed. The automatic power control circuit 19 controls the laser driver 18 so that a laser beam is outputted in accordance with the set value of the laser power.

The disk reproduction apparatus 50 has such a configuration as described above. In the disk reproduction apparatus 50, the tracking monitor circuit 20 and the system controller 10 control the timing at which the objective lens 2 performs a track jumping operation. In particular, the tracking monitor circuit 20 detects the position of the objective lens 2 which moves following up a track of the disk 100 by a tracking operation to produce a signal representative of whether or not the objective lens 2 is within a certain tolerance and signals the produced signal to the system controller 10. In response to the signal received from the tracking monitor circuit 20, the system controller 10 issues a track jumping instruction to the servo processor 14 when the objective lens 2 is within the tolerance, but does not issue a track jumping instruction to the servo processor 14 when the objective lens 2 is not within the tolerance.

The reason why the timing at which the objective lens 2 should perform track jumping is controlled in this manner is described below with reference to FIG. 3.

Figure 3:
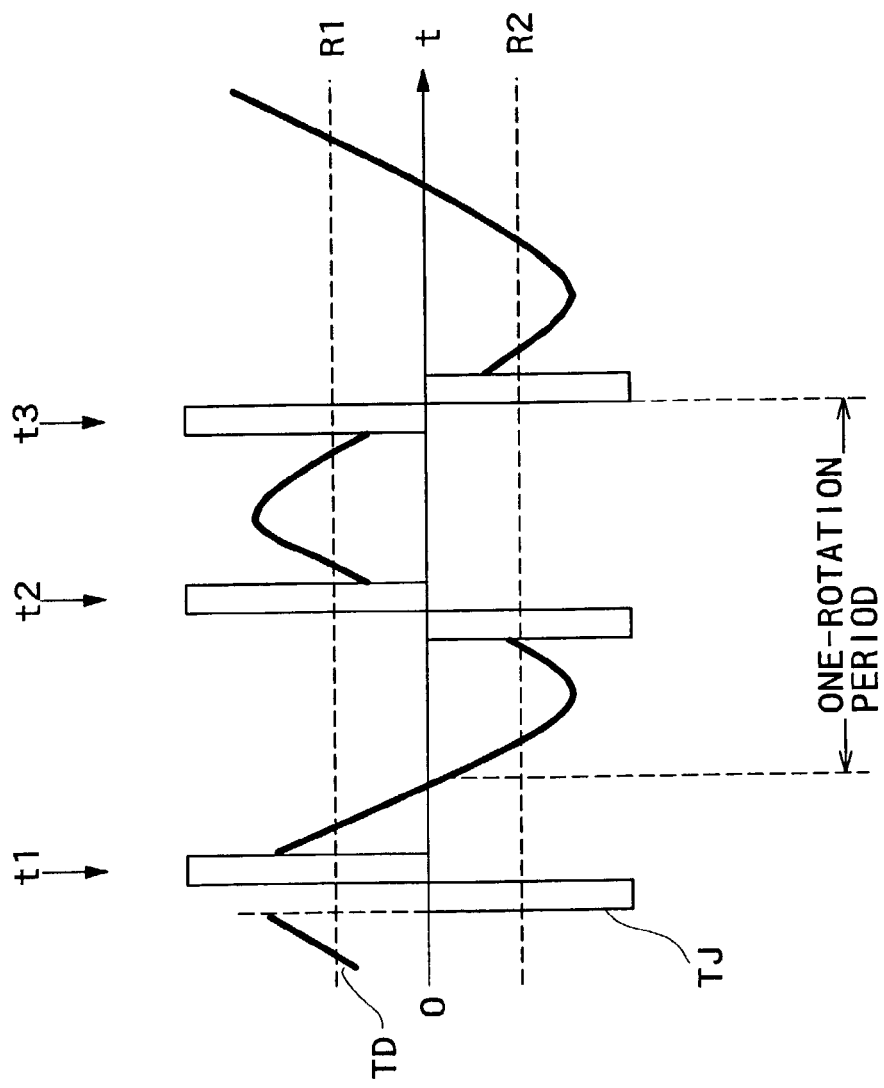
FIG. 3 is a diagram illustrating a point of time at which a track jumping operation is stabilized.

FIG. 3 shows a tracking drive signal TD and a tracking jumping signal TJ of a typical disk reproduction apparatus. In FIG. 3, a time axis t indicates lapse of time, and the line of the time axis t represents a 0-level line of the tracking drive signal TD.

The tracking drive signal TD has a waveform of a sine wave as seen in FIG. 3 since the optical pickup 2 is dislocated from a track of the disk 100 because of eccentricity of the disk. Reference symbol t1 shown in FIG. 3 represents a point of time at which the dislocation from the track by the eccentricity of the disk 100 is in the maximum and the level of the tracking drive signal TD exhibits a peak accordingly. In this state, the objective lens 2 has a maximum dislocation amount within a period of one rotation shown in FIG. 3.

Reference symbols t2 and t3 represent points of time at which the dislocation from the track by the eccentricity of the disk 100 is in the minimum and the level of the tracking drive signal TD is 0. In this state, no current is supplied to the tracking coil, and therefore, the objective lens 2 is positioned at a central position held by the two-axis mechanism 3.

It is commonly known that, if track jumping is performed at, from among the times of time t1, t2 and t3 described above, the point of time t1 at which the tracking drive signal TD has a peak level, then the track jumping operation is not stabilized. Further, it is empirically known that, if track jumping is performed at the point of time t2 or t3 at which the tracking drive signal TD has the zero level, then the track jumping operation is stabilized.

Therefore, in the disk reproduction apparatus 50 of the present embodiment, a range around the zero level of the tracking drive signal TD at which the track jumping operation is stabilized as described above, that is, a range defined by broken lines R1 and R2 shown in FIG. 3, is determined as a tolerance, and track jump timing control is performed such that, only when the level of the tracking drive signal TD is within the tolerance, that is, only when the objective lens 2 is within a corresponding tolerance, a track jumping operation is performed.

Further, in the disk reproduction apparatus 50 of the present embodiment, the tracking monitor circuit 20 and the system controller 10 select a track jumping pulse signal based on the moving direction of the objective lens 2 which moves following up a track of the disk 100 and the track jumping direction and execute a track jumping operation based on the selected track jumping pulse signal to stabilize the track jumping operation of the objective lens 2.

More particularly, the tracking monitor circuit 20 detects the moving direction of the objective lens 2, which moves following up a track of the disk 100, at a point of time immediately before a track jumping operation of the objective lens 2, and signals a signal representative of the moving direction to the system controller 10. Then, the system controller 10 recognizes the information of the moving direction of the objective lens 2 acquired from the signal from the tracking monitor circuit 20 and information of whether the track jumping direction is a radially inward direction (toward an inner circumference side) or a radially outward direction (toward an outer circumference side) of the disk 100, selects an appropriate track jumping pulse signal corresponding to the recognized information, and executes a track jumping operation based on the selected track jumping pulse signal.

While the disk reproduction apparatus 50 of the present embodiment performs track jump timing control and selection of a track jumping pulse signal as operations for stabilizing the track jumping operation in this manner, the operations are performed by the tracking monitor circuit 20 and the system controller 10 as described above.

Therefore, in the following description, a configuration and operation of the tracking monitor circuit 20 are described first, and then operation of the system controller 10 responsive to the operation of the tracking monitor circuit 20 is described.

Figure 2:
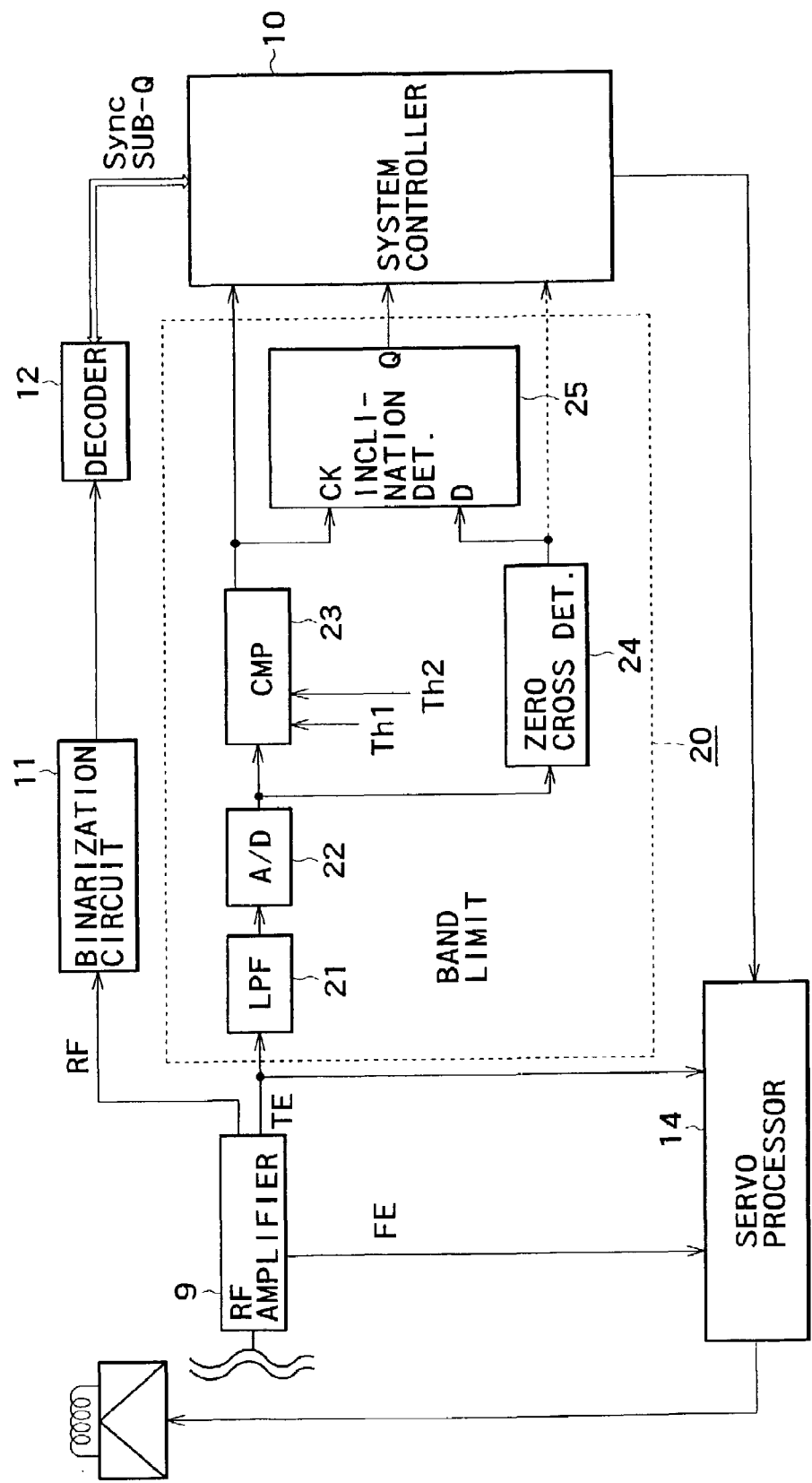
FIG. 2 is a block diagram showing an internal configuration of a tracking monitor circuit in the disk reproduction apparatus of FIG. 1.

An internal configuration of the tracking monitor circuit 20 is shown in FIG. 2. It is to be noted that FIG. 2 additionally shows only those circuits which are associated with the tracking monitor circuit 20 while the other circuits are omitted.

The tracking monitor circuit 20 includes a low-pass filter (LPF) 21, an A/D converter (A/D) 22, a comparator (CMP) 23, a zero-cross detector (ZERO CROSS DET.) 24 and an inclination detector (inclination DET.) 25.

A tracking error signal TE from the RF amplifier 9 is band-limited by the low-pass filter 21 and converted into a digital signal by the A/D converter 22. The digital signal is supplied as a tracking monitor signal TM to the comparator 23 and the zero-cross detector 24.

The comparator 23 receives the tracking monitor signal TM from the A/D converter 22 and two threshold values Th1 and Th2 illustrated in FIG. 2 as inputs thereto and compares the value of the tracking monitor signal TM with the threshold values Th1 and Th2. The comparator 23 thus produces a signal of a high (H) level or a low (L) level in accordance with a result of the comparison and supplies the produced signal to the system controller 10 and a clock terminal of the inclination detector 25.

The zero-cross detector 24 compares the tracking monitor signal TM inputted from the A/D converter 22 with a signal of the zero level and produces a signal of a high (H) level or a signal of a low (L) level in accordance with a result of the comparison. The produced signal is supplied to the system controller 10 and a D terminal of the inclination detector 25.

The inclination detector 25 may be formed from, for example, a flip-flop and latches a signal from the zero-cross detector 24 inputted as a data input thereto at a timing of a rising edge of the signal from the comparator 23 inputted as a clock signal thereto. The produced signal is outputted from a latch output terminal to the system controller 10.

In the tracking monitor circuit 20 having such a configuration as described above, the following signals are produced based on the tracking monitor signal TM by the comparator 23, zero-cross detector 24 and inclination detector 25. In particular, the comparator 23 produces a signal representative of whether or not the objective lens 2 is within the tolerance within which the track jumping operation thereof is stabilized. The zero-cross detector 24 produces a signal representative of whether the objective lens 2 is on the inner circumference side or on the outer circumference side with respect to the central point of the range within which the objective lens 2 moves within a period of one rotation due to eccentricity of the disk 100. The inclination detector 25 produces a signal representative of whether the objective lens 2 is moving in a radially inward direction or in a radially outward direction while the objective lens 2 is within the tolerance.

Figure 4:
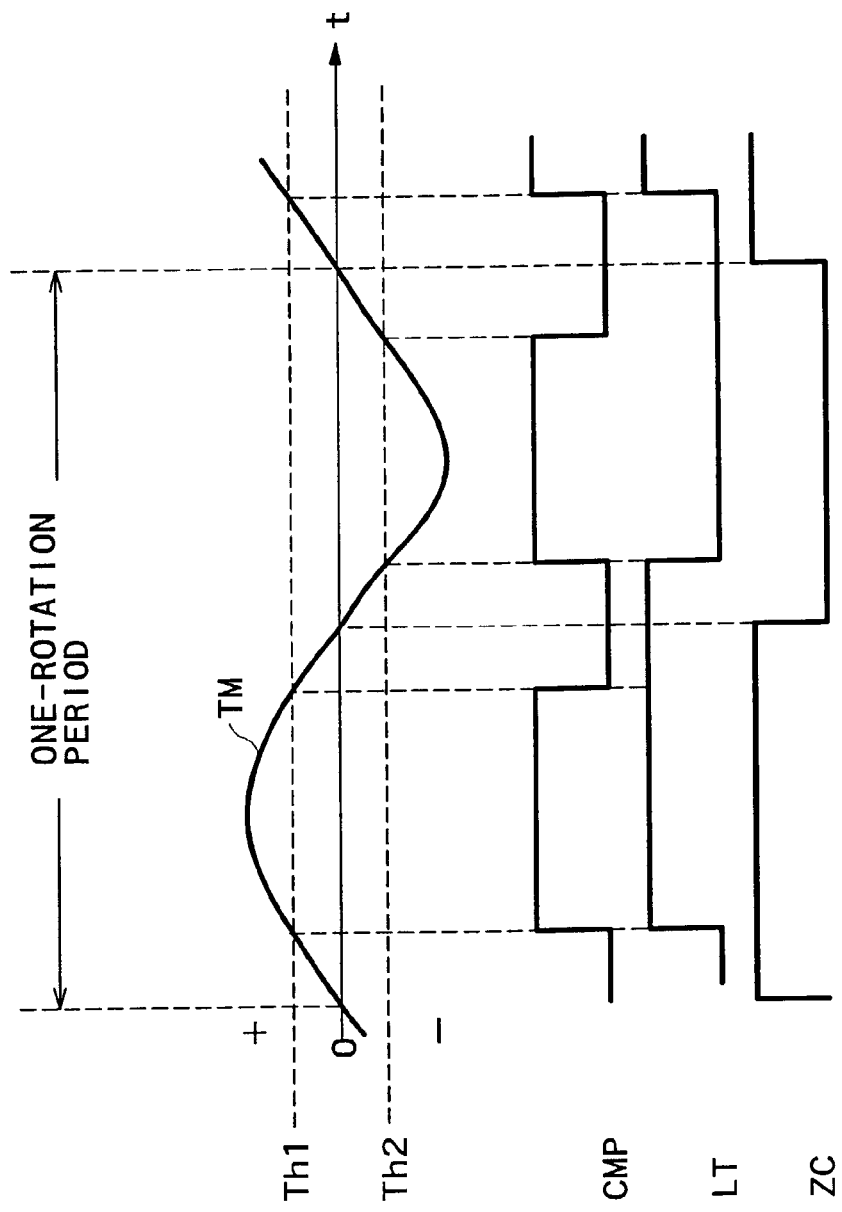
FIG. 4 is a waveform diagram illustrating a signal production operation of the tracking monitor circuit of FIG. 2.

Production operations of the signals by the circuits mentioned above are performed in such a manner as illustrated in FIG. 4.

FIG. 4 shows the waveform of the tracking monitor signal and the signals produced by the circuits in the tracking monitor circuit 20.

Referring to FIG. 4, a time axis t represents lapse of time and a zero level line of the tracking monitor signal TM, and the tracking monitor signal TM outputted from the A/D converter 22 has a waveform of a sine wave centered at the zero level line as seen in FIG. 4. In the following, the production operations of the signals mentioned above are described taking a case wherein it is determined that the objective lens 2 is moving in a radially outward direction when the tracking monitor signal TM has the positive level but it is determined that the objective lens 2 is moving in a radially inward direction when the tracking monitor signal TM has the negative level into consideration.

First, the signal production operation of the comparator 23 is described.

The two threshold values Th1 and Th2 to be inputted to the comparator 23 are set to the values of an upper limit and a lower limit of the tolerance within which the track jumping operation of the objective lens 2 is stabilized. As seen in FIG. 4, the threshold value Th1 is set to the upper limit value while the threshold value Th2 is set to the lower limit value.

The comparator 23 compares the tracking monitor signal TM and the threshold values Th1 and Th2 inputted thereto with each other, and produces a signal represented as a signal CMP in FIG. 4 which has the H level when the value of the tracking monitor signal TM exceeds the upper limit or exceeds the lower limit but has the L level in any other case, that is, when the value of the tracking monitor signal TM is within the tolerance. The comparator 23 thus produces such a signal representative of whether or not the objective lens 2 is within the tolerance within which the track jumping operation is stabilized, that is, whether the objective lens 2 is positioned in the proximity of the zero cross, as represented as a comparator output signal CMP in FIG. 4.

The zero-cross detector 24 receives a signal of the value of the zero level of the tracking monitor signal TM as an input thereto and compares the received signal with the tracking monitor signal TM inputted thereto to produce a signal represented as a signal ZC in FIG. 4 which has the H level when the value of the tracking monitor signal TM exceeds the zero level but has the L level when the value of the tracking monitor signal TM is lower than the zero level.

Consequently, the zero-cross detector 24 produces a signal representative of whether or not the objective lens 2 is positioned on the inner circumference side or the outer circumference side as viewed from the central point of the range within which the objective lens 2 moves within a period of one rotation due to eccentricity of the disk 100.

The inclination detector 25 receives the comparator output signal CMP as a clock input thereto and receives the zero-cross output signal ZC as a data input thereto, and latches the zero-cross output signal ZC at a timing of a rising edge of the comparator output signal CMP. In other words, the inclination detector 25 produces a signal as represented by a signal LT in FIG. 4 which has the H level when the zero-cross output signal ZC has the H level but has the L level when the zero-cross output signal ZC has the L level at the timing of a rising edge of the comparator output signal CMP. The inclination detector 25 produces such a latch output signal LT as seen in FIG. 4 in this manner.

The latch output signal LT can be used to discriminate the moving direction of the objective lens 2. In particular, the moving direction of the objective lens 2 can be discriminated by checking whether the latch output signal LT has the L level or the H level when the comparator output signal CMP is in a state of the L level, that is, when the objective lens 2 is within the tolerance. In particular, when the latch output signal LT has the H level while the comparator output signal CMP has the L level, since the waveform of the tracking monitor signal TM exhibits transition to the negative as seen in FIG. 4, it can be determined that the objective lens 2 is moving in a radially inward direction. On the contrary, when the latch output signal LT has the L level, since the waveform of the tracking monitor signal TM exhibits transition to the positive as seen in FIG. 4, it can be determined that the objective lens 2 is moving in a radially outward direction.

The comparator output signal CMP and the latch output signal LT produced in such a manner as described above are supplied to the system controller 10 as described hereinabove. The system controller 10 thus executes a track jump timing control process based on the comparator output signal CMP and a track jumping pulse selection process based on the latch output signal LT.

In the following, operation of the track jump timing control process and the track jumping pulse selection process of the system controller 10 is described with reference to a flow chart of FIG. 5 which illustrates processing operation of the system controller 10.

First, the system controller 10 generates a track jumping process in a radially inward direction or in a radially outward direction to a certain target address at step S101. Then, the processing advances to step S102, at which the system controller 10 supervises whether or not a frame synchronizing signal from the decoder 12 described hereinabove with reference to FIG. 1 is received. If the frame synchronizing signal is not received, then the system controller 10 waits for supply of the frame synchronizing signal. When the frame synchronizing signal is received, the system controller 10 recognizes the value of the frame synchronizing signal and advances its processing to step S103.

At step S103, the system controller 10 reads in the SUB-Q code of the sub code in the frame recognized at step S102, recognizes the position (address) of the track being currently traced by the objective lens 2 and recognizes the distance to the target track included in the instruction recognized at step S101. After the process is completed, the processing advances to step S104.

At step S104, the system controller 10 discriminates whether the comparator output signal CMP supplied thereto from the comparator 23 has the L level or the H level. If the comparator output signal CMP has the H level, that is, when the objective lens 2 is outside the tolerance, the processing goes back to step S102, but if the comparator output signal CMP has the L level, that is, when the objective lens 2 is within the tolerance, the processing advances to step S105.

In particular, only when the system controller 10 detects at step S104 that the comparator output signal CMP has the L level, that is, the objective lens 2 is within the tolerance around the zero cross, the processing advances to processing operation steps for transmission of a parameter to the servo processor 14 provided following the step S105. As a result, the system controller 10 realizes such track jump timing control that, when the objective lens 2 is within the tolerance, the system controller 10 issues an instruction (permission) of track jumping to the servo processor 14, but when the objective lens 2 is not within the tolerance, the system controller 10 does not issue an instruction (permission) of track jumping.

If track jumping is permitted in this manner at step S104, then the system controller 10 advances its processing to step S105. At step S105, the system controller 10 sets a parameter for producing a track jumping signal of a pulse period corresponding to the number of tracks for jumping included in the instruction recognized at step S101. After the process is completed, the processing advances to step S106.

At step S106, the system controller 10 discriminates whether the track jumping instruction at step S101 indicates a radial inward direction or a radially outward direction. If the track jumping direction is a radially inward direction, then the processing advances to step S107, but if the track jumping direction is a radially outward direction, then the processing advances to step S108.

At steps S107 and S108, the system controller 10 discriminates whether the latch output signal LT inputted from the inclination detector 25 has the H level or the L level to recognize the moving direction of the objective lens 2 which is moving by the tracking operation.

The moving direction of the objective lens 2 can be discriminated by discriminating whether the latch output signal LT has the L level or the H level when the comparator output signal CMP has the L level as described hereinabove. Accordingly, since it was discriminated already at step S104 described above that the objective lens 2 is within the tolerance, that is, the comparator output signal CMP has the L level, the moving direction of the objective lens 2 can be recognized at each of the steps S107 and S108 by discriminating whether the latch output signal LT has the L level or the H level.

If it is discriminated at step S107 that the latch output signal LT has the L level, then the processing advances to step S109, but if it is discriminated the latch output signal LT has the H level, then the processing advances to step S110. On the other hand, if it is discriminated at step S108 that the latch output signal LT has the L level, then the processing advances to step S111, but if it is discriminated that the latch output signal LT has the H level, then the processing advances to step S112.

At each of steps S109 and S110 following the step S107 and steps S111 and S112 following the step S108, the system controller 10 transmits a parameter for production of a track jumping signal determined for the respective condition at the step to the servo processor 14.

The parameter is used to produce a track jumping signal including a moving pulse signal and a braking pulse signal based on the track jumping direction recognized at step S106 and the moving direction of the objective lens 2 recognized at step S108 (and represented by the L or H level of the latch output signal LT).

It is to be noted that, in the present specification, the term "moving pulse signal" signifies a pulse signal for accelerating the objective lens 2 in the track jumping direction and the term "braking pulse signal" signifies a pulse signal for accelerating the objective lens 2 in the direction opposite to the track jumping direction, that is, for decelerating the objective lens 2 which has been moved with the moving pulse signal.

Accordingly, as regards the polarity of a pulse signal, the polarity of the moving pulse signal to the radially outward direction is same as that of the braking pulse signal to the radially inward direction, and the polarity of the moving pulse signal to the radially inward direction is same as that of the braking pulse signal to the radially outward direction.

The parameters determined for the conditions at steps S109 to S112 are set so that such track jumping signals as illustrated in FIGS. 6A to 6D can be produced, respectively.

Figure 6A:
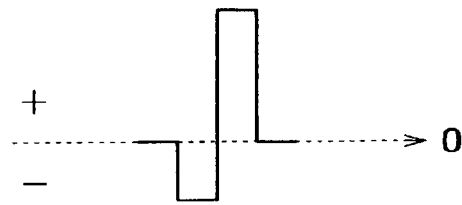
FIGS. 6A to 6D are waveform diagrams illustrating different track jumping signals produced with different parameters.
Figure 6B:
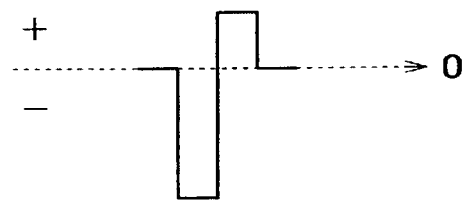
Figure 6C:
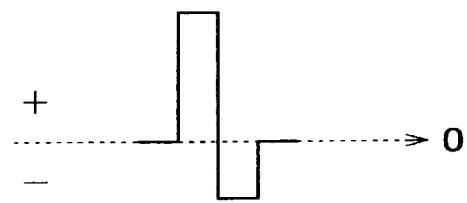
Figure 6D:
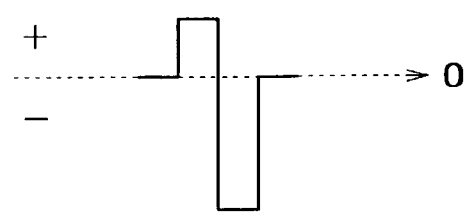

In particular, FIG. 6A illustrates a track jumping signal produced with the parameter determined based on the conditions at step S109, and FIGS. 6B to 6D illustrate track jumping signals produced with the parameters determined based on the conditions at steps S110 to S112, respectively. In each of FIGS. 6A to 6D, a broken line represents a line of the zero level of the signal.

The conditions at step S109 are such that the track jumping direction is a radially inward direction and that the latch output signal LT has the L level, that is, the moving direction of the objective lens 2 by the tracking operation is a radially inward direction. In this instance, in order to stabilize the track jumping direction, it is necessary to decrease the moving pulse signal (acceleration in the radially inward direction) and increase the braking pulse signal.

More particularly, in this instance, since moving energy in a radially inward direction is already produced in the objective lens 2 immediately before the track jumping operation is performed, the energy of the moving pulse signal for the track jumping in a radially inward direction is set to a comparatively low level whereas the braking energy for braking after the movement for the track jumping operation is set to a comparatively high level.

Therefore, at step S109, the system controller 10 sets a parameter A for producing a track jumping signal including a moving pulse signal having a comparatively low level on the negative side and a braking pulse signal having a comparatively high level on the positive side as seen in FIG. 6A.

The conditions at step S110 are such that the track jumping direction is a radially inward direction and that the latch output signal LT has the H level, that is, the moving direction of the objective lens 2 is a radially outward direction. In this instance, in order to stabilize the track jumping direction, it is necessary to increase the moving pulse signal (acceleration in the radially inward direction) and decrease the braking pulse signal.

More particularly, in this instance, since moving energy in a radially outward direction is already produced in the objective lens 2 immediately before the track jumping operation is performed, the energy of the moving pulse signal for the track jumping in a radially inward direction is set to a comparatively high level whereas the braking energy for braking after the movement for the track jumping operation is set to a comparatively low level.

Therefore, at step S110, the system controller 10 sets a parameter B for producing a track jumping signal including a moving pulse signal having a comparatively high level on the negative side and a braking pulse signal having a comparatively low level on the positive side as seen in FIG. 6B.

The conditions at step S111 are such that the track jumping direction is a radially outward direction and that the latch output signal LT has the L level, that is, the moving direction of the objective lens 2 is a radially inward direction. In this instance, in order to stabilize the track jumping direction, it is necessary to increase the moving pulse signal (acceleration in the radially outward direction) and decrease the braking pulse signal from the same reason as that at step S110. Therefore, at step S111, the system controller 10 sets a parameter C for producing a track jumping signal including a moving pulse signal having a comparatively high level on the positive side and a braking pulse signal having a comparatively low level on the negative side as seen in FIG. 6C.

The conditions at step S112 are such that the track jumping direction is a radially outward direction and that the latch output signal LT has the H level, that is, the moving direction of the objective lens 2 is a radially outward direction. In this instance, in order to stabilize the track jumping direction, it is necessary to decrease the moving pulse signal (acceleration in the radially outward direction) and increase the braking pulse signal from the same reason as that at step S109. Therefore, at step S112, the system controller 10 sets a parameter D for producing a track jumping signal including a moving pulse signal having a comparatively low level on the positive side and a braking pulse signal having a comparatively high level on the negative side as seen in FIG. 6D.

In this manner, at steps S109 to S112, the parameters A to D corresponding to the track jumping directions and the moving directions of the objective lens 2 conditioned at the respective steps are set. One of the parameters set at one of the steps S109 to S112 which correspond to the given conditions is transmitted to the servo processor 14 thereby to realize the track jumping pulse selection processing operation.

After the selected parameter is transmitted in this manner, the servo processor 14 is conditioned to output a track jumping signal based on the parameter.

After the system controller 10 transmits a parameter at one of the steps S109 to S112, it issues an instruction to execute a track jumping operation to the servo processor 14 at step S113.

In response to the instruction, the servo processor 14 turns off the tracking servo operation and outputs a track jumping signal produced based on the received parameter to cause the objective lens 2 to execute a track jumping operation.

After the system controller 10 issues the track jumping instruction to the servo processor 14 in this manner, the processing advances to step S114.

At step S114, the system controller 10 discriminates whether or not the track jumping process of the servo processor 14 is completed. If the system controller 10 discriminates that the track jumping process is not completed, then it waits for the track jumping process is to be completed. Then, when the system controller 10 discriminates that the track jumping process is completed, the processing advances to step S115, at which the system controller 10 issues an instruction to turn on a tracking servo operation to the servo processor 14.

With the end of the processing at step S115, the track jump timing control process and the track jumping pulse selection process of the system controller 10 are ended.

It is to be noted that actually the system controller 10 reads in, after it causes the servo processor 14 to turn on a tracking servo operation, the sub code Q data to confirm the address of the track of the jumping destination to confirm whether or not the target address is reached. If the system controller 10 recognizes that the target address is not reached, then the system controller 10 generates a track jumping process to the target address at step S101 again. However, if the system controller 10 recognizes that the target address is reached, then it ends the track jumping process.

In summary, in the disk reproduction apparatus 50 of the present embodiment described above, the system controller 10 sets one of the parameters A to D to be used for production of a track jumping pulse signal including a moving pulse signal and a braking pulse signal corresponding to the conditions of the moving direction of the objective lens 2 which moves by a tracking operation and the track jumping direction.

Further, the system controller 10 discriminates the moving direction based on the latch output signal LT produced by the tracking monitor circuit 20 and representative of the moving direction of the objective lens 2 and executes the track jumping pulse selection process of a track jumping pulse signal including a moving pulse signal and a braking pulse signal conforming with the conditions.

Consequently, the operation of the objective lens 2 can be controlled such that, when a track jumping operation of the objective lens 2 is to be performed in a direction in which the objective lens 2 is moving by a tracking operation, the acceleration energy to be applied to the objective lens 2 is set to a comparatively low level and the deceleration energy is set to a comparatively high level. Further, the operation of the objective lens 2 can be controlled such that, in order to cause the objective lens 2 to perform a track jumping operation in the direction opposite to a direction in which the objective lens 2 is moving by a tracking operation, the acceleration energy to be applied to the objective lens 2 is set to a comparatively high level and the deceleration energy is set to a comparatively low level.

Further, in the disk reproduction apparatus 50 of the present embodiment, the system controller 10 executes the track jump timing control process based on the comparator output signal CMP produced by the tracking monitor circuit 20. Consequently, the disk reproduction apparatus 50 is advantageous in that a track jumping operation at a timing at which the track jumping operation is stabilized is realized and consequently the track jumping operation is stabilized.

It is to be noted that, while, in the disk reproduction apparatus 50 of the present embodiment, the track jump timing control by the system controller 10 is executed while the tolerance is set to a range of the tracking monitor signal TM in the proximity of the zero level, the following method may be adopted instead.

In particular, the zero cross output signal from the zero-cross detector 24 is supplied to the system controller 10 as indicated by a broken line in FIG. 2, and the system controller 10 controls the servo processor 14 to execute a track jumping operation at a timing at which the tracking monitor signal TM exhibits the zero level.

Figure 5:
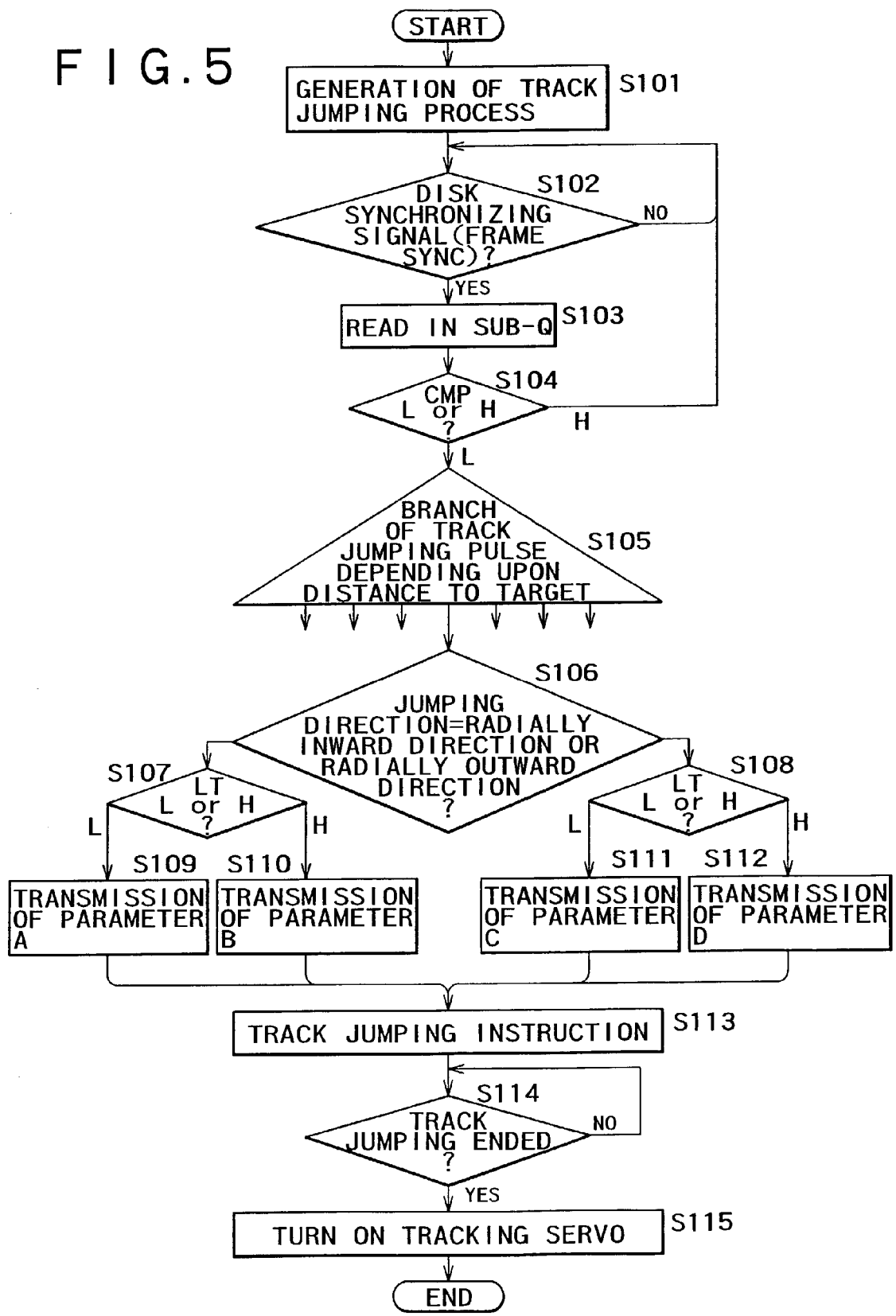
FIG. 5 is a flow chart illustrating operation of a system controller of the disk reproduction apparatus of FIG. 1 in a track jump pulse selection process and a track jump timing control process.

In this instance, for example, the flow chart of FIG. 5 is modified such that the system controller 10 waits for an edge timing of the zero-cross output signal ZC at step S104.

The above-described method can further stabilize the track jumping operation.

Further, while the disk reproduction apparatus 50 of the present embodiment in the foregoing description is a CD player, it is not limited to a CD player but may otherwise be, for example, a disk reproduction apparatus for some other CD such as a CD-R (Recordable) or a CD-RW (Rewritable) or a disk reproduction apparatus for a DVD (Digital Versatile Disk).

Furthermore, while the disk reproduction apparatus 50 of the present embodiment adopts the method wherein, when the track jumping pulse selection processing operation is to be performed, the system controller 10 transmits a parameter to the servo processor 14 and the servo processor 14 produces a track jumping signal based on the parameter to perform track jumping control, it may otherwise adopt another method wherein the system controller 10 produces a track jumping signal and controls the servo processor 14 to perform track jumping control in accordance with the track jumping signal.

While a preferred embodiment of the present invention has been described using specific terms, such description is for illustrative purposes only, and it is to be understood that changes and variations may be made without departing from the spirit or scope of the following claims.

What is claimed is:

1. A disk drive apparatus, comprising:
an objective lens;
means for moving said objective lens to follow up a track of a rotating disk;
signal production means for producing a track jump signal including a moving pulse signal and a braking pulse signal to drive said objective lens in a radial direction of the disk to perform a track jumping operation of said objective lens;
detection means for detecting a moving direction of said objective lens following up the track on the disk at a point of time immediately before the track jumping operation;
discrimination means for discriminating whether the feeding direction of said objective lens for the track jumping operation is a radially inward direction or a radially outward direction; and
control means for controlling said signal production means to vary the level of the moving pulse signal and the level of the braking pulse signal of the track jump signal based on a result of the discrimination of said discrimination means and the moving direction detected by said detection means.

2. A disk drive apparatus according to claim 1, wherein said control means controls said signal production means so that, when the feeding direction of said objective lens for the track jumping operation discriminated by said discrimination means and the moving direction of said objective lens at the point of time immediately before the track jumping operation detected by said detection means coincide with each other, the level of the moving pulse signal is set to a comparatively low level and the level of the braking pulse signal is set to a comparatively high level.

3. A disk drive apparatus according to claim 1, wherein said control means controls said signal production means so that, when the feeding direction of said objective lens for the track jumping operation discriminated by said discrimination means and the moving direction of said objective lens at the point of time immediately before the track jumping operation detected by said detection means are different from each other, the level of the moving pulse signal is set to a comparatively high level and the level of the braking pulse signal is set to a comparatively low level.

4. A disk drive apparatus according to claim 1, further comprising:
range detection means for detecting whether or not the position of said objective lens at the point of time immediately before the track jumping operation is within a predetermined range; and
track jump timing setting means for permitting the track jumping operation only when the position of said objective lens is discriminated to be within the predetermined range based on a result of the detection of said range detection means.

5. A track jump controlling method wherein a track jump signal including a moving pulse signal and a braking pulse signal is produced and an objective lens is driven in a radial direction of a rotating disk based on the produced track jump signal to perform a track jumping operation of said objective lens, comprising the steps of:
detecting a moving direction of said objective lens, which is moving following up a track on the disk, at a point of time immediately before the track jumping operation;
discriminating whether the feeding direction of said objective lens for the track jumping operation is a radially inward direction or a radially outward direction; and
varying the level of the moving pulse signal and the level of the braking pulse signal of the track jump signal based on a result of the discrimination and a result of the detection.

6. A track jump controlling method according to claim 5, wherein, when the feeding direction of said objective lens for the track jumping operation discriminated in said discrimination step and the moving direction of said objective lens at the point of time immediately before the track jumping operation detected in said detection step coincide with each other, the level of the moving pulse signal is set to a comparatively low level and the level of the braking pulse signal is set to a comparatively high level.

7. A track jump controlling method according to claim 5, wherein, when the feeding direction of said objective lens for the track jumping operation discriminated in said discrimination step and the moving direction of said objective lens at the point of time immediately before the track jumping operation detected in said detection step are different from each other, the level of the moving pulse signal is set to a comparatively high level and the level of the braking pulse signal is set to a comparatively low level.

8. A track jump controlling method according to claim 5, further comprising the steps of:
detecting whether or not the position of said objective lens at the point of time immediately before the track jumping operation is within a predetermined range; and
permitting the track jumping operation only when the position of said objective lens is discriminated to be within the predetermined range based on a result of the detection in said range detection step.

* * * * *